Dec. 30, 1941.  J. F. WEIN  2,268,099
SOUND REPRODUCER
Filed Sept. 30, 1939
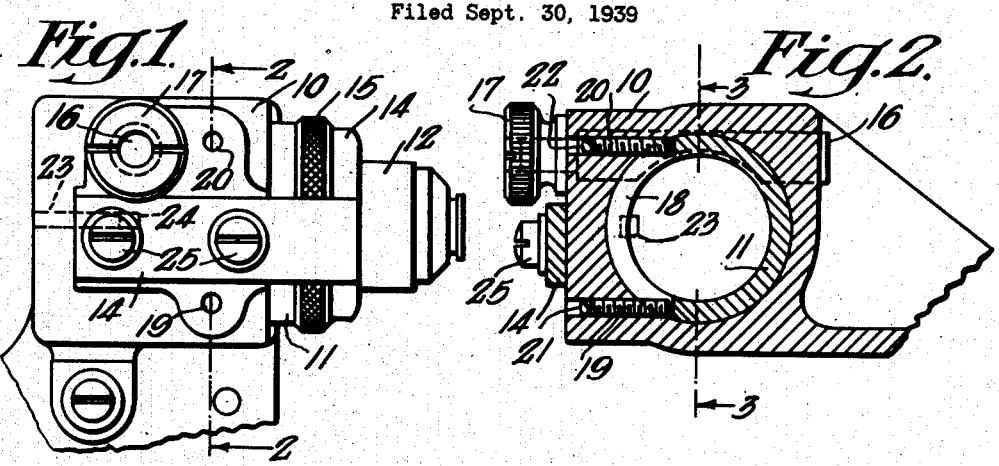
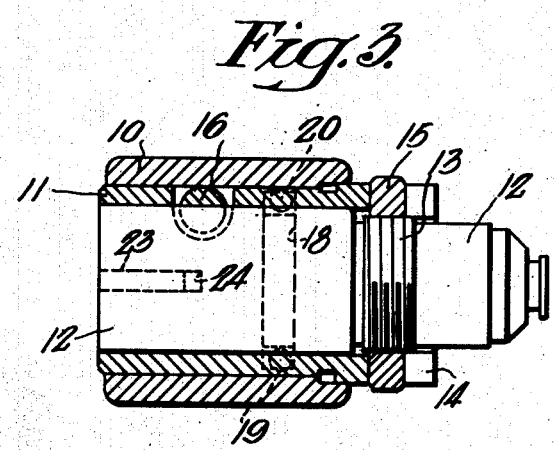
Inventor
John F. Wein
By
Attorney Patented Dec. 30, 1941

2,268,099

UNITED STATES PATENT OFFICE 2,268,099

SOUND REPRODUCER

John F. Wein, Indianapolis, Ind., assignor to Radio Corporation of America, a corporation of Delaware Application September 30, 1939, Serial No. 297,260

5 Claims. (Cl. 88—24)

This invention relates to sound reproducers and more particularly to the mounting for the optical system for photoelectric sound reproducers. The optical systems customarily used in photoelectric sound reproducers such as are used, for example, in theatres for reproducing sound from film must be located with great accuracy in relation to the point at which the film is scanned. This accuracy is necessary for the reason that the scanning beam is of the order of $5/10,000$ of an inch in width and extends completely across the sound track. If the optical system is very slightly out of focus the width of the scanning line is greatly increased causing a loss of high frequencies and if the line is not accurately transverse of the sound track distortion results.

It has heretofore been proposed to make the scanning optical systems readily adjustable for focus, position and azimuth, but such arrangements have been generally unsatisfactory because the adjustments would not stay fixed under the vibration to which they were subjected. It has also been proposed to mount the optical systems in a rigid casting which was secured to the center plate of the soundhead. This arrangement was highly satisfactory in that it stayed in adjustment but it is expensive to manufacture due to the extremely close tolerances which are required.

In the optical system mounting according to the present invention the advantage of initial adjustability is secured, thus avoiding the close tolerances required with the rigid type of mounting but at the same time the adjustments may be so fixed that they can neither get out of position nor be tampered with and I thus secure the advantages of both of the foregoing types of apparatus without the disadvantages of either.

One object of the invention is to provide an improved optical system mount.

Another object of the invention is to provide a mount for sound reproducing optical systems which may be readily adjusted in manufacture.

Another object of the invention is to provide a mount for sound reproducing optical systems which will stay permanently in adjustment.

Another object of the invention is to provide a mount for optical systems of the class described which may be readily adjusted in azimuth and which will thereafter remain fixed in such adjustment.

Other and incidental objects of the invention will be apparent to those skilled in the art from a reading of the following specification and an inspection of the accompanying drawing in which Figure 1 is a side view of my improved mount carrying an optical system;

Figure 2 is a section taken on the line 2—2 of Fig. 1 and looking toward the left; and Figure 3 is a section taken on the line 3—3 of Fig. 2 and looking toward the left.

Referring first to Fig. 1, the front of the bracket which is carried by the soundhead is indicated at 10 and into this is inserted a barrel 11 better shown in section in Fig. 3 within which is slidably mounted the optical system 12. The bracket 10 is constructed in rigidly fixed relation to the sound drum carrying mechanism so that its position in relation to the sound take-off point is not adjustable. The optical system 12 is longitudinally slidable within the sleeve 11 for the purpose of focusing and such focusing may be accomplished by rotation of the knurled nut 15 which engages the threaded portion 13 of the optical system 12. The nut 15 is held firmly against the end of the sleeve 11 by the yoke 14 which is pressed tight against the nut 15 and then secured by the screws 25 to the bracket 10. The optical system 12 is provided with a key 23 which slides in the keyway 24 thereby preventing any rotation of the optical system in relation to the sleeve 11. When the optical system 12 is in proper longitudinal adjustment, it is locked in position by tightening the nut 17 on the cutaway bolt 16 thereby firmly clamping the optical system against further movement.

It will be apparent that the sleeve 11 due to the key 23 and keyway 24 determines the azimuth adjustment of the optical system 12 and the corresponding position of the sleeve 11 is determined as follows: The sleeve 11 is cutaway as indicated at 18 for a little less than half of its diameter. Screws 19 and 20 are threaded into the bracket 10 and engage the sleeve 11 at opposite ends of the cup 18. After the soundhead is assembled and ready for test the screws 19 and 20 are adjusted until the line of light produced by the optical system is accurately transverse of the sound track position at the scanning point with both the screws 19 and 20 screwed tightly into position. After this adjustment is accomplished appropriate filling members such as lead shot 21 and 22 are placed in the threaded holes over the screws 19 and 20 and these shot are then expanded into place by means of an appropriate punch thereby locking the screws 19 and 20 in position and preventing any tampering with their adjustments.

It will be apparent from the foregoing that I have provided an optical system mount which provides a ready and simple adjustment of azimuth in assembly and which positively precludes the system getting out of such adjustment after assembly while at the same time the system may be readily and accurately adjusted for focus without any lost motion and may be readily locked in focused position.

I claim as my invention:

1. An optical system mounting including a bracket integral with the apparatus on which the optical system is to be mounted, a cylindrical sleeve rotatably mounted in a bore in said bracket, a cylindrical mounting member having an optical system axially aligned within said member mounted for axial movement within said sleeve, a keyway means between said sleeve and said member to hold said sleeve and said member against relative rotation and permit axial adjustment, opposed screw threaded means in said bracket for securing said sleeve to said bracket in rotative adjustment, and means on said bracket for moving said member and said optical system axially in said sleeve.

2. An optical system mounting including a bracket integral with the apparatus on which the optical system is to be mounted, a cylindrical sleeve rotatably mounted in a bore in said bracket, a cylindrical mounting member having an optical system axially aligned within said member mounted for axial movement within said sleeve, a keyway means between said sleeve and said member to hold said sleeve and said member against relative rotation and permit axial adjustment, opposed screw threaded means in said bracket for securing said sleeve to said bracket in rotative adjustment, means on said bracket for moving said member and said optical system axially in said sleeve, and clamping means passing through said bracket and said sleeve for clamping said optical system in adjusted position.

3. An optical system mounting including a bracket integral with the apparatus on which the optical system is to be mounted, a cylindrical sleeve rotatably mounted in a bore in said bracket, a cylindrical mounting member having an optical system axially aligned within said member mounted for axial movement within said sleeve, a keyway means between said sleeve and said member to hold said sleeve and said member against relative rotation and permit axial adjustment, opposed screw threaded means in said bracket for securing said sleeve to said bracket in rotative adjustment, means on said bracket for moving said member and said optical system axially in said sleeve, and a yoke secured to said bracket and holding said moving means firmly against the end thereof.

4. An optical system mounting including a bracket integral with the apparatus on which the optical system is to be mounted, a cylindrical sleeve rotatably mounted in a bore in said bracket, a cylindrical mounting member having an optical system axially aligned within said member mounted for axial movement within said sleeve, a keyway means between said sleeve and said member to hold said sleeve and said member against relative rotation and permit axial adjustment, opposed screw threaded means in said bracket for securing said sleeve to said bracket in rotative adjustment, means on said bracket for moving said member and said optical system axially in said sleeve, a yoke secured to said bracket and holding said moving means firmly against the end thereof, and clamping means passing through said bracket and said sleeve for clamping said optical system in adjusted position.

5. An optical system mounting including a bracket integral with the apparatus on which the optical system is to be mounted, a cylindrical sleeve rotatably mounted in a bore in said bracket, a cylindrical mounting member having an optical system axially aligned within said member mounted for axial movement within said sleeve, a keyway means between said sleeve and said member to hold said sleeve and said member against relative rotation and permit axial adjustment, opposed screw threaded means in said bracket for securing said sleeve to said bracket in rotative adjustment the heads of said screw means being within holes in said bracket, sealing means within said holes over the heads of said screws, and means on said bracket for moving said member and said optical system axially in said sleeve.

JOHN F. WEIN.